United States Patent [19]

Courbot et al.

[11] 4,071,123

[45] Jan. 31, 1978

[54] AUTOMATIC ADJUSTING DEVICE FOR A DRUM BRAKE

[75] Inventors: Pierre Courbot, Villiers le Bel; Yves Meyer, Taverny, both of France

[73] Assignee: Societe Anonyme D.B.A., Paris, France

[21] Appl. No.: 748,999

[22] Filed: Dec. 9, 1976

[51] Int. Cl.² .............................................. F16D 51/52
[52] U.S. Cl. .......................... 188/331; 188/79.5 GE; 188/79.5 P; 188/196 BA; 188/196 F
[58] Field of Search ...................... 188/71.8, 331–332, 188/79.5 GE, 79.5 GC, 79.5 GT, 79.5 P, 363, 196 C, 196 BA, 196 F, 196 V

[56] References Cited

U.S. PATENT DOCUMENTS

| 2,822,893 | 2/1958 | Flueler | 188/79.5 P X |
| 3,621,947 | 11/1971 | Margetts | 188/79.5 P |
| 3,762,510 | 10/1973 | Newstead | 188/79.5 P |

Primary Examiner—Stephen G. Kunin
Assistant Examiner—Douglas C. Butler
Attorney, Agent, or Firm—Paul David Schoenle; Ken C. Decker

[57] ABSTRACT

A drum brake of the type comprising two brake shoes adapted to be spaced apart by a wheel cylinder. The distance between the ends of the shoes which cooperate with the wheel cylinder is automatically increased to compensate for the wear of the brake linings by an adjusting device which defines the rest position of the ends. The device comprises an extensible member of the screw and nut type, two annular resilient members which grippingly engage corresponding cylindrical portions of the extensible member, and a cam which rotates the resilient members one relative to the other in a first direction upon a brake application and in the opposite direction upon brake release to limit extension of the extensible member to a predetermined value.

7 Claims, 15 Drawing Figures

AUTOMATIC ADJUSTING DEVICE FOR A DRUM BRAKE

The invention relates to an adjusting device for a drum brake.

A large number of known adjusting devices are situated either inside a wheel cylinder or on a spacer disposed close to the brake operating means and connected to each shoe, or on the end of a lever pivoted on one shoe and connected, for example, to the other shoe by a spacer. These known adjusting devices automatically take up the wear on the linings of the brake shoes, either during operation of the brake or on release of the brake. They usually comprise a pawl cooperating with a toothed sector on a lever or with a ratchet wheel. In either case, the adjustment depends on the length of the teeth, that is to say, it is inherently large relative to the operating clearance normally existing between the linings and the drum. There is therefore a risk of over-adjustment when repeated brake operation has led to appreciable expansion of the drum.

To overcome these disadvantages of known adjusting devices, the invention proposes an adjusting device for a drum brake, comprising driving means responsive to relative motion between two brake portions capable of moving apart during operation of the brake to control relative rotation of two elements of an extensible member in a first direction so as to extend the latter, the driving means being situated between a first one of the elements and a first one of the brake portions, the other element being prevented from rotating and connected to the other brake portion, this device being characterized in that the driving means comprise control means responsive to relative motion between the two brake portions and two friction members cooperating with appropriate surfaces or revolution formed on the first element or on the first brake portion, each friction member being responsive to a torque applied to it in one or the other direction by the control means to increase or decrease the frictional force prevailing between each friction member and the corresponding surface, the torque applied to each member by the control means being different, and the torque applied to each member on release of the brake being opposite to and substantially equal to the torque applied to each member on operation of the brake, so that the operative driving means are constituted by the control means and by a first one of the friction members on operation of the brake, whereas they are constituted by the control means and by the other friction member on release of the brake.

In a particular embodiment of the invention, each of the friction members is a friction spring of which one end is bent radially to cooperate with the control means. Preferably, the control means comprise at least one slot which is formed in the first brake portion or in the first element respectively and which is entered by the said end of a corresponding one of the springs.

Various embodiments of the invention will now be described by way of example with reference to the accompanying drawings, in which.

Figure 1:
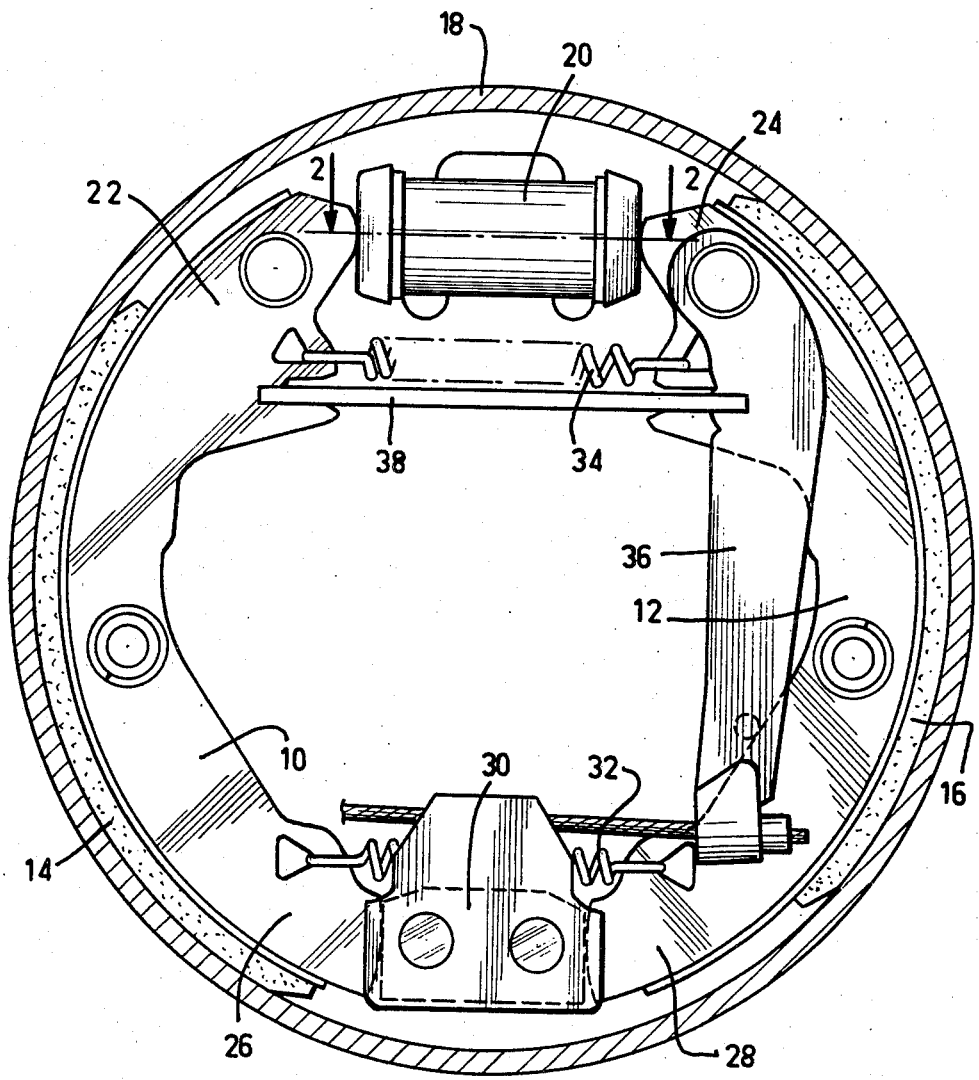
FIG. 1 is a general view of a brake embodying the principles of the invention.

The drum brake illustrated in FIG. 1 has two shoes 10, 12 slidable on a fixed support plate (not shown) which can be mounted on a fixed component of the vehicle, for example an axle flange. Each shoe 10, 12 has a respective lining 14, 16 designed to cooperate with a drum 18. A hydraulically operated wheel cylinder 20 is provided between two adjacent ends 22, 24 of the shoes 10, 12 respectively. The other two ends 26, 28 of the shoes 10, 12 are urged into floating contact with a fulcrum block 30 by a spring 32. Another spring 34 urges the ends 22, 24 of the shoes 10, 12 towards the wheel cylinder 20. The embodiment illustrated by way of example also has a handbrake level 36 pivoted on the shoe 12 near the wheel cylinder 20. The handbrake lever 36 is connected to the shoe 10 by a spacer 38.

Figure 2:
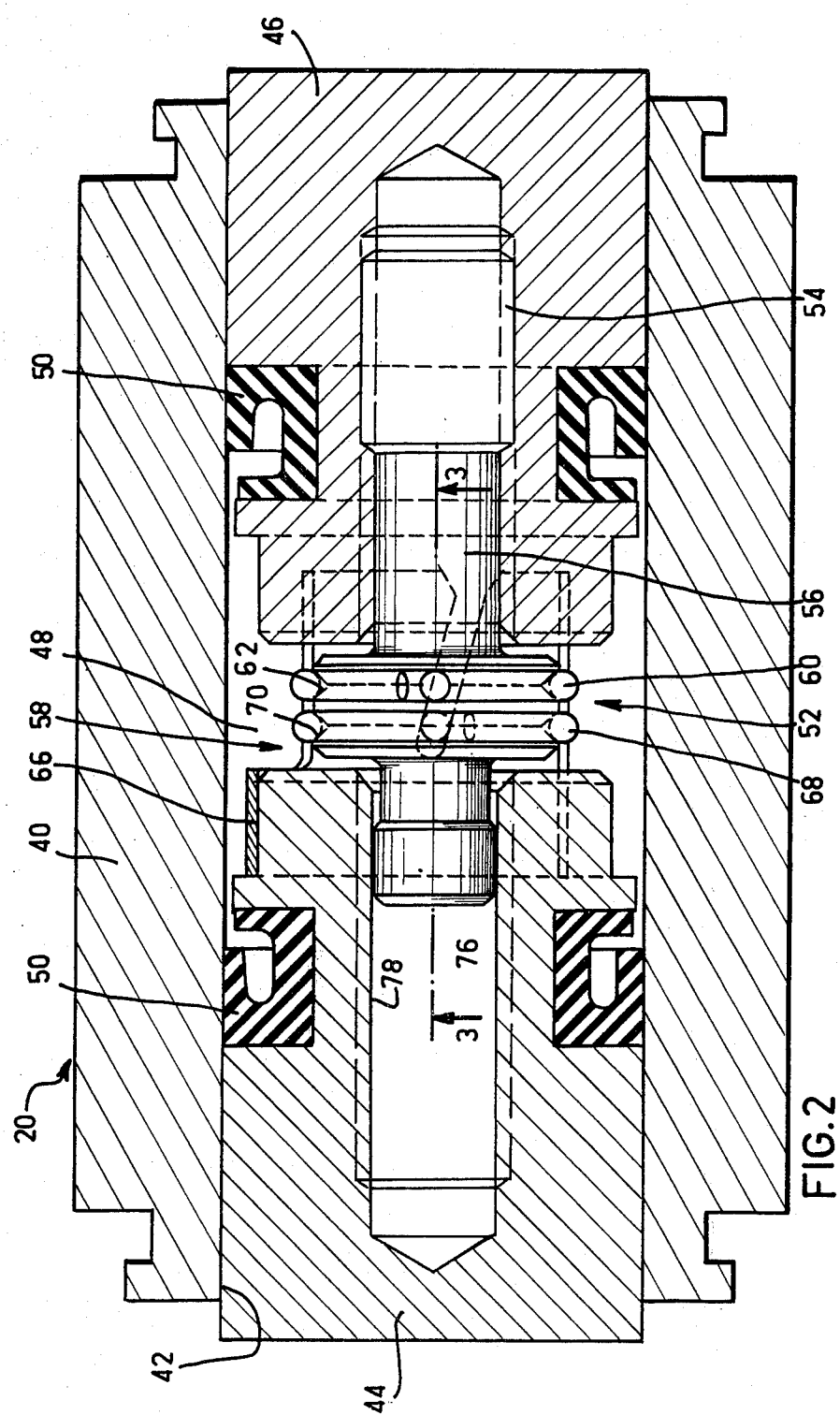
FIG. 2 is a section along a line 2—2 in FIG. 1.
Figure 3:
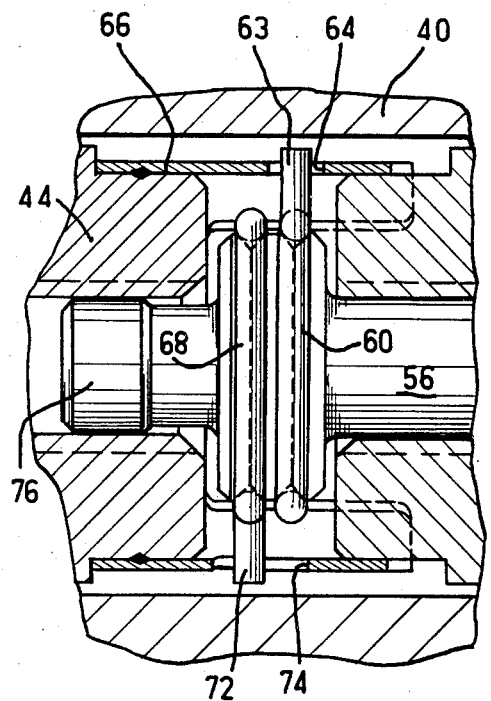
FIG. 3 is a section along a line 3—3 in FIG. 2.
Figure 4:
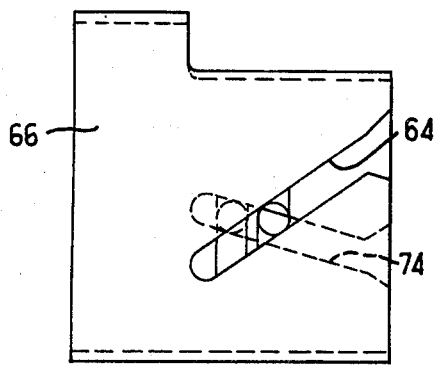
FIG. 4 is a detail showing elements of the adjusting device shown in FIGS. 2 and 3.

As FIG. 2 shows, the wheel cylinder 20 has a housing 40 containing a bore 42 which slidably receives two oppositely arranged pistons 44, 46 normally engaging the shoe ends 22, 24 under the influence of the spring 34. The compartment 48 defined between the pistons 44, 46 is normally connected by an orifice (not shown) to a pressure fluid source, for example the master cylinder of the vehicle. Seals 50 are housed in grooves in the periphery of the pistons 44, 46 to seal the compartment 48. An adjusting device generally designated 52 is inserted between the pistons 44, 46, which are designed to move apart when the brake operates. The adjusting device 52 comprises an extensible member consisting of two elements cooperating by means of a screw-and-nut connection. The nut forming element is the piston 46, which is tapped at 54 to receive a screw forming element 56. Note that the pistons 44, 46 are prevented from rotating because they cooperate with the shoes 10, 12. The extension of the extensible member consisting of the piston 46 and screw forming element 56 is therefore caused by rotation of the screw forming element 56, which in turn is caused by entraining means generally designated 58. As will be seen below, the entraining means 58 comprise first means for changing the length of the extensible member when the pistons 44, 46 move apart, and second means for changing the length of the extensible member when the pistons 44, 46 move closer together. The first entraining means comprise a one-way coupling formed by a friction spring 60, with a single coil, frictionally cooperating with a V-groove 62 formed in the outside surface of the screw forming element 56. The first entraining means also comprise a cam forming device constituted by a slot 64, which is formed in a sleeve 66 connected to the piston 44 by welding or the like and which receives one end 63 of the spring 60, this end being bent radially outwards. Similarly, the second entraining means comprise a one-way coupling formed by a friction spring 68 with a single coil cooperating frictionally with a groove 70 in the outside surface of the screw forming element 56. The end 72 of the spring 68 is also bent radially outwards to cooperate with a second slot 74 in the sleeve 66. The grooves 62, 70 are identical, as are the friction springs 60 and 68, which are coiled in the same direction. As FIG. 4 shows, the slots 64, 74 incline in opposite directions relative to the the axis of the wheel cylinder. The slots 64 and 74 are diametrically opposite one another on the sleeve 66, which is partly open to permit brake fluid to flow between the pistons 44, 46 so as to operate the wheel cylinder. To guarantee axial alignment of the screw forming element 56 with the piston 46 when the extensible member which they form is in the extended position, the screw forming element 56 bears an axial projection 76, which enters a bore 78 in the piston 44.

Figure 5:
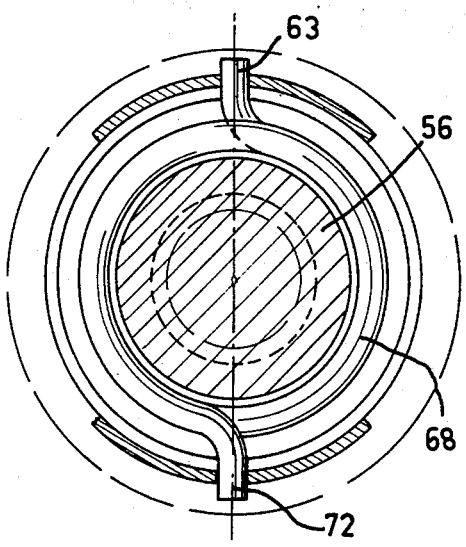
FIG. 5 is a cross-section representing the adjusting device when the brake is idle.
Figure 6:
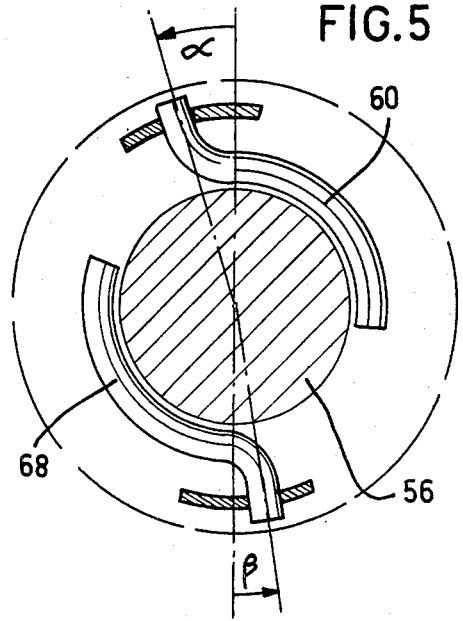
FIG. 6 is a view identical to FIG. 5, but showing the adjusting device during operation of the brake.

The adjusting device just described operates as follows:

When the wheel cylinder 20 is operated, that is, when brake fluid is introduced to the compartment 48, the pistons 44, 46 are urged apart in order to operate the brake by applying the friction linings 14, 16 to the drum 18. When the pistons move apart, the screw forming element is urged axially in the same direction as the piston 46, owing to the screw-and-nut connection 54. The sleeve 66, however, is drawn in the opposite direction by the piston 44. The ends 63 and 72 of the springs 60, 68 therefore follow the slots 64, 74 respectively and consequently tend to turn about the screw forming element 56 in two opposite directions. Since the springs 60, 68 are in frictional engagement with the grooves 62, 70 with the same force, and since when idle they occupy the positions shown in FIG. 5, the spring 60 is urged anticlockwise in FIG. 5, whereas the spring 68 is urged clockwise. The latter therefore tends to slide along the groove 70, whereas the spring 60, by contrast, grips the groove 62 more tightly. The screw forming element 56 therefore follows the movement of the spring 60, so that it is turned conterclockwise relative to the piston 46 through an angle α, as shown in FIG. 6. Such rotation of the element 56 corresponds to extension of the extensible member which it forms with the piston 46. The spring 68, on the other hand, follows only the movement imposed on it by the slot 74, and it therefore turns counterclockwise through angle β relative to its idle position.

Figure 7:
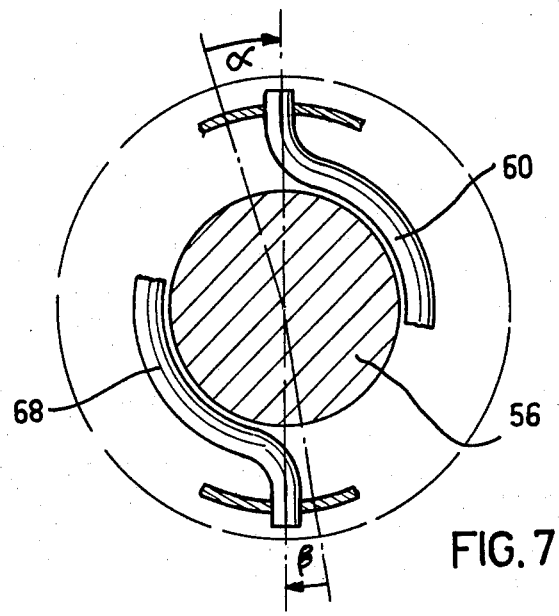
FIG. 7 is a view identical to FIGS. 5 and 6, but showing the adjusting device in the position which it occupies after release of the brake.
Figure 12:
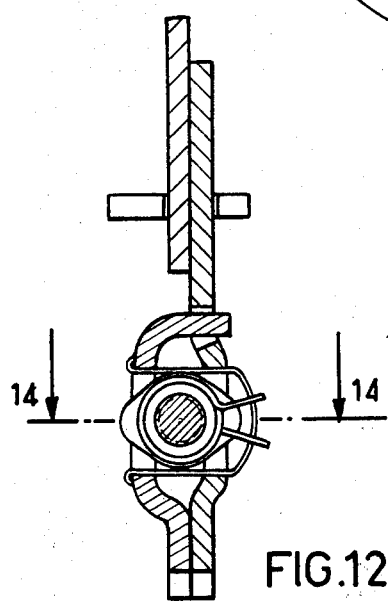
FIG. 12 is a section along a line 12—12 in FIG. 10.

When the braking pressure in the compartment 48 of the wheel cylinder 20 is relieved, each of the elements of the brake is urged into its idle position by the spring 34. The pistons 44, 46 are therefore moved together, as are the screw forming element 56 and sleeve 66. The ends 63, 72 of the springs 60, 68 are consequently caused to turn clockwise in FIG. 6. Owing to the difference between the angles defined by the slots 64 and 74 with the axis of the wheel cylinder 20, the frictional force prevailing between the spring 68 and the screw forming element 56 exceeds the frictional force existing between the spring 60 and the element 56, so that the latter follows the movement imposed on it by the spring 68, owing to the cooperation between the end 72 of this spring and the slot 74. However, the spring 60 slides along the groove 62 and therefore turns clockwise through an angle α relative to the position shown in FIG. 6, which it occupied on operation of the brake. Simultaneously, the spring 68 turns through an angle β relative to the position which it occupied on operation of the brake, so that on release of the brake the springs 60, 68 and screw forming element 56 occupy the positions illustrated in FIG. 7. In all, therefore, the screw forming element will have turned clockwise (that is, in the direction corresponding to extension of the extensible member) through an angle equal to the difference between the angles α and β and spread respectively over the periods corresponding to operation and release of the brake.

Figure 8:
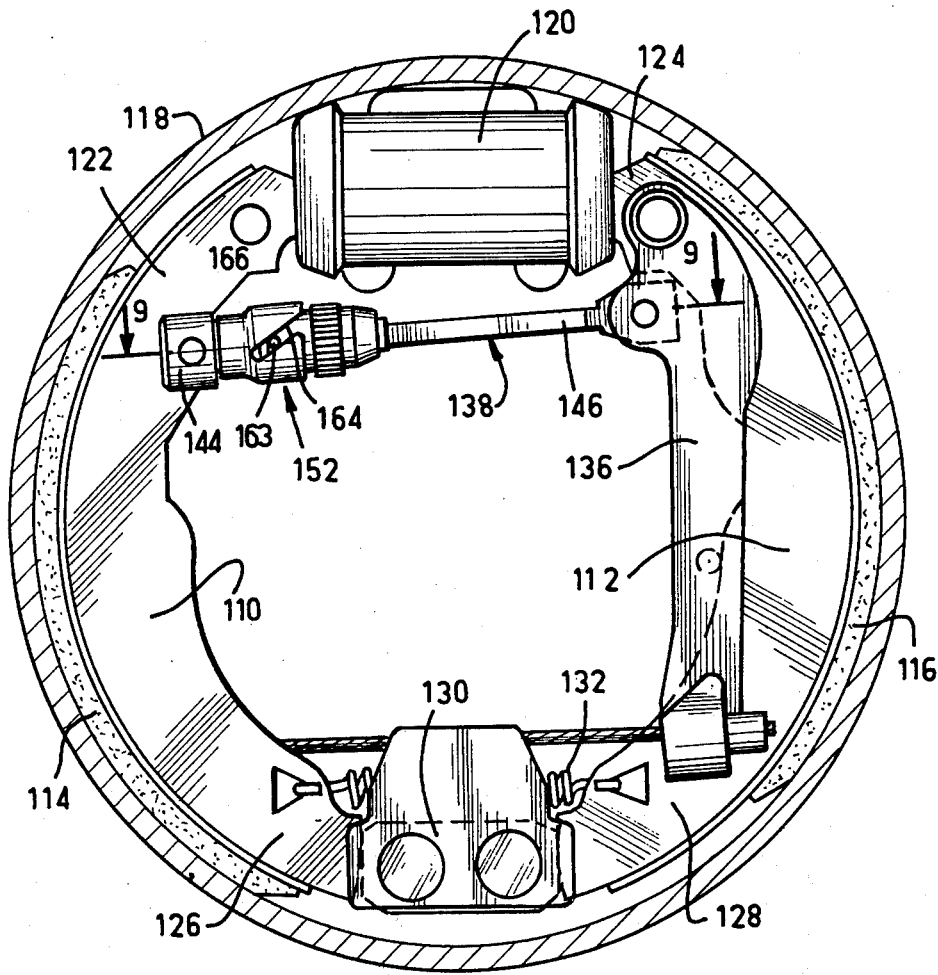
FIG. 8 is a general view of a drum brake incorporating another adjusting device embodying the invention.
Figure 9:
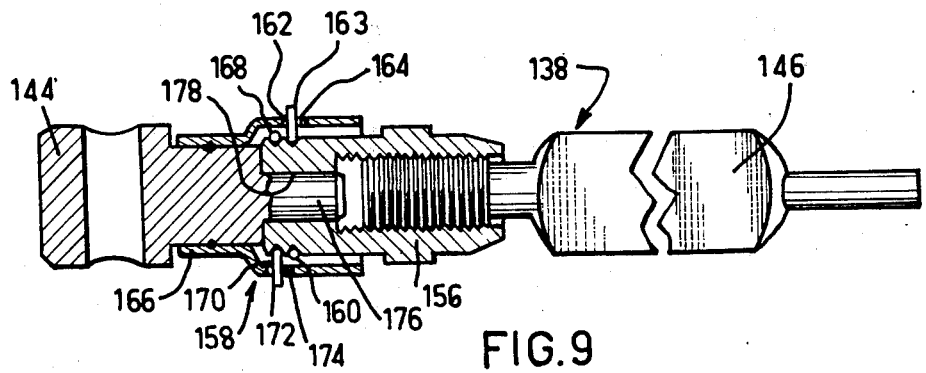
FIG. 9 is a section on a larger scale along a line 9—9 in FIG. 8.
Figure 10:
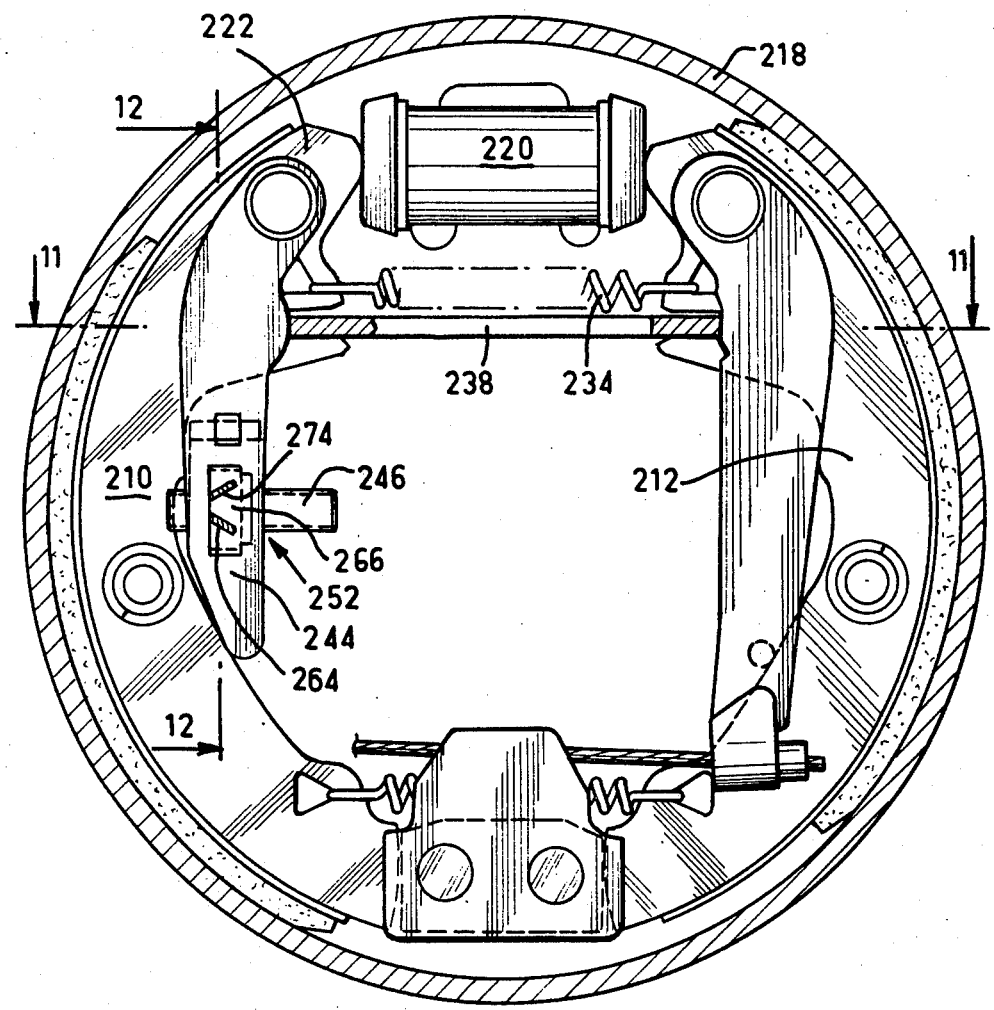
FIG. 10 is a general view of a brake incorporating a further adjusting device embodying the invention.
Figure 11:
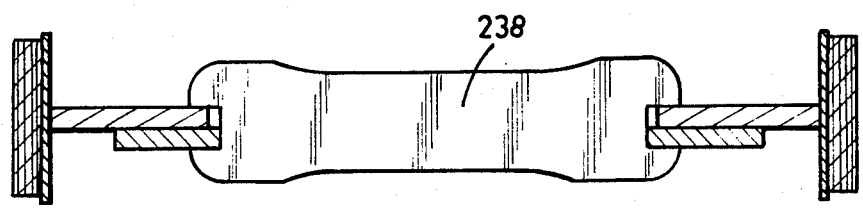
FIG. 11 is a section on a line 11—11 in FIG. 10.

The drum brake described with reference to FIGS. 8 and 9 is of the same type as that described with reference to FIGS. 1 to 7. The adjusting device used is also comparable to that in the previous embodiment and differs from it only in its position on the brake. Identical reference numerals plus 100 has been used to designated elements comparable to those in the previous embodiment.

The drum brake illustrated in FIG. 8 has two brake shoes 110, 112 bearing respective linings 114, 116 designed to cooperate with a drum 118. In this embodiment, application means in the form of a wheel cylinder 120 are provided between the two adjacent ends 122, 124 of the shoes 110, 112 respectively. The other two ends 126, 128 of the shoes are urged into floating contact with a fulcrum block 130 by a spring 132. A handbrake lever 136 is pivoted on the end 124 of the shoe 112. The lever 136 is connected to the other shoe 110 by a spacer 138, on which is mounted an adjusting device 152 comparable to the device 52 incorporated in the cylinder 20 of the first embodiment. It will be appreciated that the spacer 138 connecting the lever 136 to the shoe 110 could similarly connect the shoe 112 to the shoe 110.

As FIG. 9 shows, the spacer 138 has two portions 144, 146 associated respectively with the shoe 110 and with the handbrake lever 136, the portions 144 and 146 being capable of moving apart on operation of the brake. The portion 146 constitutes the screw forming element of an extensible member on which the nut forming element 156 can be rotated by entraining means 158, which with the extensible member form an adjusting device 152. As in the previous embodiment, the entraining means 158 comprise first means for changing the length of the extensible member when the portions 144, 146 move apart, and second means for changing the length of the extensible member when the portions 144, 146 move closer together. These first and second entraining means comprise a first spring 160 and a second spring 168, of which the respective ends 163, 172 cooperate with respective slots 164, 174 in a sleeve 166, which is connected by welding or the like to the portion 144 of the spacer 138. The friction springs 160, 168 are of identical dimensions and are coiled in the same direction in grooves 162, 170 in the nut forming element 156. A projection 176 on the spacer portion 144 enters a bore 178 in the nut forming element 156, so that the axial alignment of the various elements of the adjusting device 152 is preserved even when the latter is in its extended position.

Operation of the adjusting device 152 is entirely comparable to operation of the adjusting device 52 described with reference to the first embodiment, except that the entraining means are not responsive to relative motion of the same portions of the brake. It will be appreciated that in this embodiment the wheel cylinder 120 could be replaced with any other actuating device, for example a mechanical control of the wedge or cam type.

The drum brake described with reference to FIGS. 10 to 15 is also of the same type as the brakes described in the two previous embodiments. It too differs in the position of the adjusting device. In this embodiment elements comparable to those in the first embodiment are designated by the same reference numeral plus 200.

In this embodiment the adjusting device 252 is mounted between the end of an adjusting lever 244 and the brake shoe 210, which constitute two respective brake portions capable of moving apart on operation of the brake. The adjusting lever 244 is pivoted near the end 222 of the shoe 210 and is connected to the other shoe 212 by a spacer 238, so that the lever 244 responds to relative motion of the shoes 210, 212.

Figure 14:
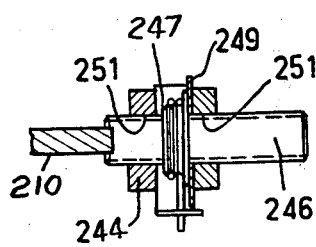
FIG. 14 is a section along a line 14—14 in FIG. 12 illustrating the adjusting device when the brake is idle.
Figure 15:
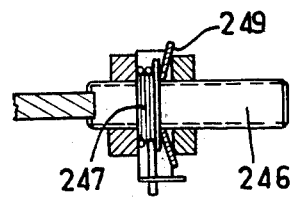
FIG. 15 is a view identical to FIG. 14, showing the adjusting device when the brake is operated while the wear on the linings exceeds a predetermined value.

As in the previous embodiments, the adjusting device 252 comprises an extensible member formed of a screw forming element 246, prevented from rotating relative to the shoe 210 as shown more particularly in FIGS. 14 and 15, and a nut forming element 247. As FIGS. 14 and 15 show, the adjusting device 252 is mounted directly near the free end of the adjusting lever by means of a connection with play and by means of a resilient washer 249 which acts as an adjustment limiting device. The end of the lever 244 forms a fork of which the arms are traversed by two axially aligned passages 251 which receive the screw forming element 246. The nut forming element 247 and the resilient washer 249 are mounted between the arms of the lever 244 with predetermined play. Under the influence of the shoe return spring 234 and spacer 238, the adjusting lever 244 is normally urged clockwise to compress the resilient washer 249 and to urge the screw forming element 246 by way of the nut forming element 247 into abutment with the web of the shoe 210, as shown in FIG. 14. As in the previous embodiments, the outside surfaces of the nut forming element 247 contains two grooves 262, 270 which receive respective single-coil friction springs 260, 268, each having one end 263, 272 respectively bent radially outwards. The springs 260, 268 are installed like the springs in the previous embodiments, and their ends 263, 272 cooperates with slots 264, 274 in a plate 266 associated with the end of the adjusting lever 244. In this embodiment the slots 264, 274 are inclined in opposite directions relative to the axis of the extensible member consisting of the elements 246, 247.

The drum brake just described with reference to FIGS. 10 to 15 operates as follows.

Figure 13:
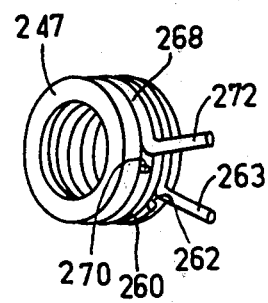
FIG. 13 is a perspective view of part of the adjusting device shown in FIGS. 10 to 12.

On operation of the wheel cylinder 220, the shoes 210, 212 are urged apart and on to the drum 218. During this movement the resilient washer 249 inserted between the nut forming element 247 and the adjusting lever 244 links the extensible member to the shoe 210 and the lever 244 to the spacer 238. As a result the adjusting lever 244 is turned counterclockwise on its pivot, whereas the extensible member follows the movement of the shoe 210. This relative motion of the lever 244 and extensible member causes the ends 263, 270 of the springs 260, 268 respectively to move along the slots 264, 274. The arrangement of the slots is such that the ends 263, 272 are urged towards one another as shown in FIG. 13, so that the frictional force prevailing between the spring 268 and nut forming element 247 exceeds the frictional force prevailing between the spring 260 and nut forming element 247. The nut forming element 247 therefore carries out the movement imposed on it by the spring 268, that is, the movement defined by the slot 274. As the slot 274 inclines relative to the axis of the extensible member, the nut forming element 247 turns clockwise in FIG. 12 on the screw forming element 246. Simultaneously, the spring 260 slides anticlockwise round the nut forming element 247 due to the cooperation between its end 263 and the slot 264. If operation of the brake requires the shoes 210, 212 to move far enough apart to bring the nut forming element 247 into abutment with that arm of the adjusting lever 244 not supporting the resilient washer 249, as shown in FIG. 15, the force stored in the resilient washer 249 no longer urges the extensible member towards the web of the shoe 210, and there is therefore no longer relative motion of the lever 244 and extensible member, and consequently no longer any take-up of wear.

When the braking pressure in the wheel cylinder 220 is relieved, the shoes 210, 212 are urged towards one another by the spring 234. If operation of the brake has demanded operation of the adjustment limiting means constituted by the resilient washer 249 and by the connection with play between the nut forming element 247 and the end of the lever 244, the latter remains linked to the extensible member until the action of the resilient washer 249 begins to move the extensible member back towards the web of the shoe 210. From this moment the device behaves exactly as if the adjustment limiting means have not been used, and under the influence of the return spring 234 the resilient washer 249 is compressed by way of the lever 244 and spacer 238 until it resumes the position shown in FIG. 14. During this movement the lever 244 turns clockwise on its pivot, whereas the extensible member remains in contact with the shoe 210, so that the ends 263, 272 of the springs 260, 268 again move along the slots 264, 274. When the lever 244 turns in this direction, the relative positions of the slots 264, 274 are such that the ends 263, 272 are urged apart and the frictional force existing between the spring 260 and nut forming element 247 becomes greater than that existing between the spring 268 and the nut forming element. The nut forming element 247 therefore carries out the movement imposed by it by the slot 264. As a result of this movement the nut forming element 247 turns clockwise in FIG. 12 on the screw forming element 246.

The angle through which the nut forming element 247 will finally have turned on the screw forming element 246 in the direction corresponding to extension of the extensible member which it forms is therefore to the sum of the angles defined by the inclination of the slots 264, 274 relative to the axis of the extensible member, the wear take-up during operation of the brake being defined by the slot 274 whereas the wear take-up during release of the brake is defined by the slot 164. As in the previous embodiments, therefore, such an arrangement enables the wear take-up to be distributed as appropriate between the application of the brake and the release of the brake, the total wear take-up being in any case defined by the angle formed between each of the two slots.

The adjustment limiting means described in this last embodiment enable over-adjustment of the brake to be avoided by linking the adjusting lever and adjusting device when their relative motion exceeds the predetermined value.

We claim:

1. An automatic adjusting device for a drum brake having brake shoes adapted for engagement with a rotary drum by actuating means between adjacent ends of the brake shoes, said adjusting device comprising:

an extensible member for disposing said brake shoes relative to said rotary drum, said extensible member including a pair of elements, extension of said extensible member being controlled by relative rotation between said elements; and driving means interconnecting with a first shoe of said brake shoes and a first element of said pair of elements to control rotation of said first element upon actuation of the actuating means, the second element of said pair of elements being nonrotatably connected to a second shoe of said brake shoes, the first element having a pair of grooves;

said driving means including a cam forming means movable in response to movement of said first shoe and repair of resilient wires engaging said cam forming means, each said wire frictionally engaging a respective groove on the first element to rotate the latter when said cam forming means moves, the frictional engagement between each resilient wire and its corresponding groove varying according to the direction of movement of said cam forming means.

2. The automatic adjusting device of claim 1, wherein a first end of each wire is bent radially to cooperate with the cam forming means.

3. The automatic adjusting device of claim 2, wherein the cam forming means comprises at least one slot which is formed in an intermediate member operatively connected to said first brake shoe, said first end of a corresponding one of said wires entering said slot.

4. The automatic adjusting device of claim 1, wherein each wire includes a single loop cooperating with the groove on the first element.

5. The automatic adjusting device of claim 1, wherein means for eliminating the movement applied to each resilient wire when the relative motion between said adjacent ends of the shoes exceeds a predetermined value are associated with the cam forming means.

6. The automatic adjusting device of claim 5, wherein a first end of each wire is bent radially to cooperate with the cam forming means, said cam forming means including at least one slot which is formed in an intermediate member operatively connected to said first brake shoe, said first end of a corresponding one of said wires entering said slot, the latter being open at one end to constitute the movement eliminating means.

7. The automatic adjusting device of claim 5, wherein the movement eliminating means comprises an abutment formed at one end of a slot a resilient means between an intermediate member and the first element for permitting relative motion between the intermediate member and the first element without rotation of the latter.

* * * * *